United States Patent [19]

Bolon et al.

[11] 4,374,972

[45] Feb. 22, 1983

[54] COATING SOLUTION OF POLYETHERIMIDE OLIGOMERS

[75] Inventors: Donald A. Bolon; Thomas B. Gorczyca, both of Schenectady, N.Y.

[73] Assignee: General Electric Company, Schenectady, N.Y.

[21] Appl. No.: 296,390

[22] Filed: Aug. 26, 1981

[51] Int. Cl.³ .............................................. C08G 73/10
[52] U.S. Cl. .............................. 528/185; 174/110 SR; 174/110 N; 528/125; 528/126; 528/128; 528/170; 528/172; 528/26; 528/208; 428/375
[58] Field of Search ............... 528/125, 126, 128, 172, 528/185, 170, 26, 208; 174/110 SR, 110 N; 428/375

[56] References Cited

U.S. PATENT DOCUMENTS

3,498,948  3/1970  Minami et al. ...................... 528/185
4,157,996  6/1979  Boldebuck et al. .................. 528/185

*Primary Examiner*—Lester L. Lee
*Attorney, Agent, or Firm*—Richard J. Traverso; James C. Davis, Jr.; James Magee, Jr.

[57] ABSTRACT

Disclosed is a coating solution including an oligomeric polyetherimide component, an organic diamine component, an organic triamine component, a solvent system and optionally water, which may be coated on a substrate and polymerized to form high quality polyetherimide coatings and a process for preparing the solution.

20 Claims, No Drawings

COATING SOLUTION OF POLYETHERIMIDE OLIGOMERS

This invention relates to a coating solution which can be cured to form smooth insulative coatings, more particularly the present invention relates to a coating solution containing an oligomeric polyetherimide, an organic diamine and an organic triamine and to a process for preparing the solution.

U.S. Pat. No. 3,847,867 (Heath and Wirth) discloses polyamide acid solutions prepared by reacting aromatic bis (ether anhydrides) and organic diamines in dipolar aprotic organic solvents under ambient conditions. The Heath et al patent also discloses use of the solutions as wire coating enamel. U.S. Pat. No. 3,917,643 (Takekoshi and Kochanowski) discloses a wire coating enamel comprising a solution of polyetherimide in a phenolic solvent, such as phenol or mixtures of o-, p- and m cresols, and a method of making polyetherimides by reacting aromatic bis(ether anhydrides) and organic diamines in the phenolic solvent at temperatures between about 100° C. and 250° C. Both of these materials yield coating solutions with a moderate to high viscosity and a low solids content, both undesirable in present technology.

Crossreference is made to copending application Ser. No. 287,340 assigned to the same assignee as the present invention which is herein incorporated by reference. This application describes and claims polyetherimide coating compositions containing oligomers and methods for making the same which can be employed in the practice of the present invention.

Crossreference is also made to application Ser. No. 288,707 assigned to the same assignee as the present invention which is herein incorporated by reference. This application describes and claims coating solutions of polyetherimide forming monomers, including trifunctional amines for crosslinking, which can be employed in the practice of the present invention.

U.S. Pat. No. 2,935,487 (Fox and Zavist), U.S. Pat. No. 3,211,585 (Meyer and Zalewski), U.S. Pat. No. 4,096,291 (Dunwald, Lewalter, Zecher and Last) disclose the use of polymerized isocycanates such as cyanurates as additives for their isocyanate character which crosslink by reacting with excess —OH groups, e.g. in polyesterimide enamel, but not for use as triamine precursors.

Resin solutions based on polyimide chemistry use several methods to achieve needed high temperature properties. Polyesterimides incorporate trifunctional alcohols into the polyester portion of the material to attain the necessary crosslinking. Polyimides are prepared with many of the amines present as amic acids where the acid aids solubility until during cure the imide is formed, creating insolubility.

The amide imides generally have excess amine groups which along with the methylene group in the methylene dianiline, gives the crosslinking mechanism. For example, the methylene is oxidized from heating and the resultant carbonyl reacts with the excess amine to form crosslinks.

A process that depends upon high temperature atmospheric oxidation is not easily controlled, therefore a system that would not require thermal oxidation for crosslinking was desirable.

It has now been found by practice of the present invention that high solids coating solutions containing oligomeric polyetherimides can be prepared by reacting at least one bis(ether anhydride) with less than a stoichometric amount of at least one diamine in a suitable solvent system to form oligomeric polyetheramic acids which are subsequently heated to close the amic acids forming the imides, followed by hydrolysis of the terminal anhydride groups to the free acids. The oligomer solution is then mixed with triamine, additional diamine, and diluted to a workable viscosity with a suitable solvent. The final coating solution can then be easily coated on substrates and subsequently heated to remove the solvent and to cure the resin thereby forming a smooth, insulative polyetherimide enamel which typically has good thermal characteristics, good dielectric properties and excellent flexibility.

Generally stated, in the present invention there is provided a coating solution including oligomeric polyetherimides formed by:

(a) reacting at least one aromatic bis(ether anhydride) of the formula:

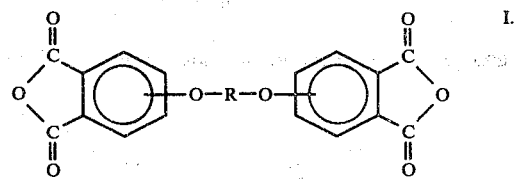

with less than a stoichometric amount of at least one diamine of the general formula:

in a suitable solvent to form oligomeric polyetheramic acids containing terminal anhydride groups;

(b) heating the solution of (a) to form oligomeric polyetherimide anhydrides;

(c) hydrolizing the oligomeric anhydrides of (b) to form the free acids of the formula:

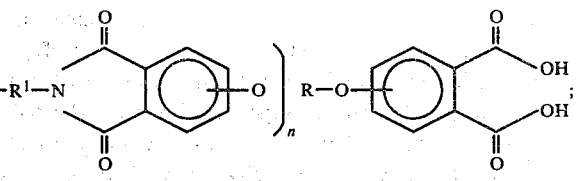

(d) adding to the oligomer solution of (c) triamine of the general formula

more of the same or different diamine, and optionally more solvent and water; where R is a member selected from the class consisting of (A) divalent organic radicals having the following formulas:

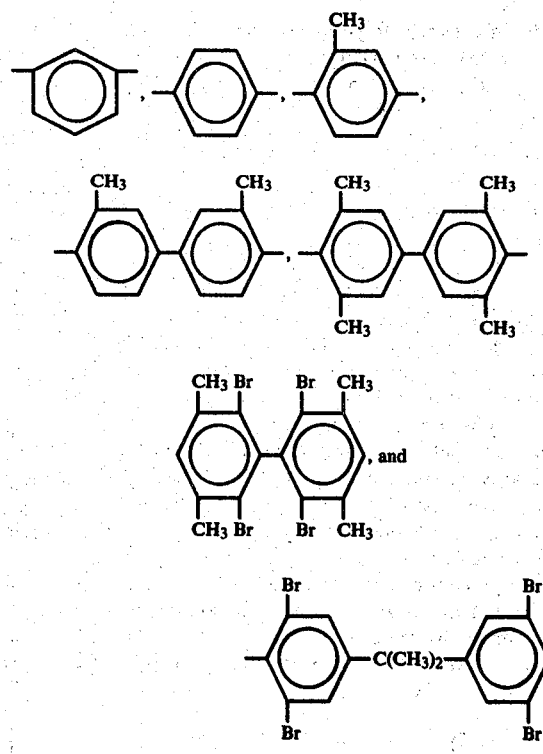

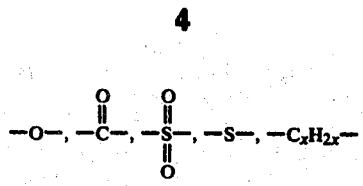

where x is an integer from 1 to 5 inclusive; $R^2$ is a member selected from the class consisting of (a) the following trivalent aromatic radicals

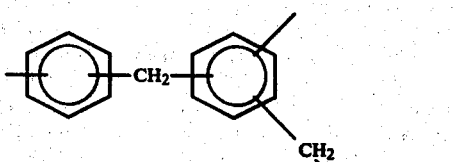

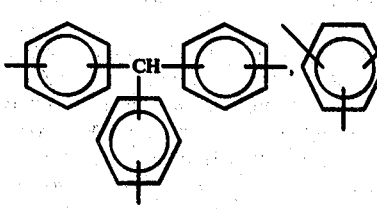

and the like; and (b) trivalent aliphatic radicals, for example,

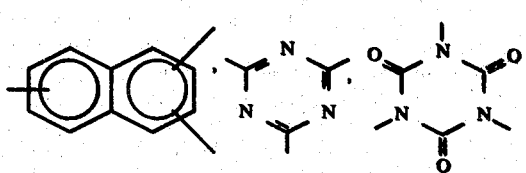

and the like, or combinations thereof; and n is an integer from 0 to 100, and a method for preparing said coating solution.

Included by the aromatic bis(ether anhydride)s of formula I are compounds having the formulas:

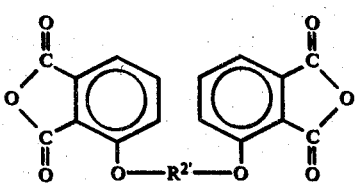

IV.

and (B) divalent organic radicals of the general formula:

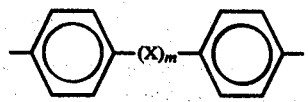

where m is 0 or 1 and X is a member selected from the class consisting of divalent radicals of the formulas,

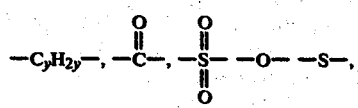

where y is an integer from 1 to 4; $R^1$ is a divalent organic radical selected from the class consisting of (a) aromatic hydrocarbon radicals having from 6 to about 20 carbon atoms and haloginated derivatives thereof, (b) alkylene radicals having from 2 to about 20 carbon atoms, and cycloalkylene radicals having from 3 to about 30 carbon atoms, (c) from $C_2$ to $C_8$ alkylene terminated polydiorganosiloxane, and (d) divalent radicals of the general formula:

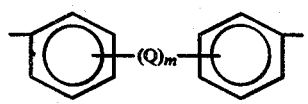

where m is as previously defined and Q is a member selected from the class consisting of

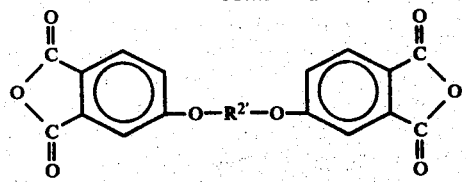

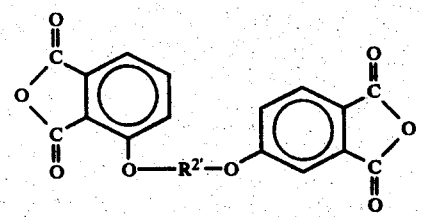

where R² is 

and Q¹ is selected from —O—, —S—, $-\overset{\overset{\displaystyle CH_3}{|}}{\underset{\underset{\displaystyle CH_3}{|}}{C}}-$, and $-\overset{\overset{\displaystyle O}{\|}}{\underset{\underset{\displaystyle O}{\|}}{S}}-$.

Dianhydrides included by formula IV are, for example,
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)diphenylsulfone dianhydride.

Dianhydrides included by formulas V and VI are, for example,
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'(3,4-dicarboxyphenoxy)-diphenyl-2,2-propane dianhydride, etc.

In addition to formulas IV–V above, aromatic bis (ether anhydride)s also included by formula I are shown by Koton, M. M.; Florinski, F. S.; Bessonov, M. I.: Rudakov, A. P. (Institute of Heteroorganic Compounds, Academy of Sciences, USSR) USSR 257,010, Nov. 11, 1969, Appl. May 3, 1967 and also dianhydrides shown by M. M. Koton, F. S. Florinski, Zh Org. Kin 4(5) 774 (1968).

Some of the aromatic bis(ether anhydride)s of formula I are shown in Darrell Heath and Joseph Wirth, U.S. Pat. No. 3,972,902, and assigned to the same assignee as the present invention. These dianhydrides can be prepared from the hydrolysis, followed by dehydration, of the reaction product of a nitro-substituted phenyl dinitrile with a metal salt of a dihydric phenol compound in the presence of a dipolar apriotic solvent. For example, a benzenoid compound of the formula,

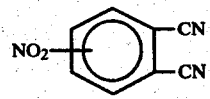

where the NO₂ group can be positioned anywhere in the benzene ring, preferably in the 4-position, can be reacted in dimethyl formamide with an alkali metal salt of a dihydric phenol to form an alkali metal salt of the general formula, Alk—O—R³—O—Alk where R³ is a divalent aromatic radical and Alk is an alkali metal ion. Various well known procedures can be used to convert the resulting tetranitriles to the corresponding tetraacids and dianhydrides.

Included by the alkali metal salts of the above described dihydric phenols are sodium and potassium salts of the following dihydric phenols:
2,2-bis(2-hydroxyphenyl)propane;
2,4'-dihydroxydiphenylmethane;
bis(2-hydroxyphenyl)methane;
2,2-bis(4-hydroxyphenyl)propane herein also identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide;
3,4'-dihydroxydiphenylmethane;
4,4'-dihydroxybenzophenone;
4,4'-dihydroxydiphenyl ether;
hydroquinone;
resorcinol, etc.

Included by the organic diamines of formula II, are, for example,
m-phenylenediamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonapthalene;
3,3'-dimethylbenzidine;
3,3'-dimethoxybenzidine;
2,4-bis(β-amino-t-butyl)toluene;
bis(p-β-amino-t-butylphenyl)ether;
4,4'-diaminobenzophenone;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;

bis(4-aminocyclohexyl)methane;
3-methylheptamethylenediamine;
4,4-dimethylheptamethylenediamine;
2,11-dodecanediamine;
3,3-dimethylpropylenediamine;
octamethylenediamine;
3-methoxyhexamethylenediamine;
2,5-dimethylhexamethylenediamine;
2,6-dimethylheptamethylenediamine;
2-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(3-aminobutyl)tetramethyldisiloxane; etc.

Triamines which can be used in the process of the present invention include 2,4-bis(p-aminobenzyl)aniline, hereinafter also known as "BABA", melamine, 2,4,6-triethylene amine cyanurate, 1,3,5-triethylene amine isocyanurate, 1,3,5 tri(3-amino 4 methylphenyl-)isocyanurate and other isomers thereof and the like. Triamine precursors may also be used; such as 1,3,5 tri[4-methyl-3-isocyanato phenyl]isocyanurate which is commercially available from Mobay Chemical Company as major component of Mondur SH ®, blocked polyisocyanate, this trifunctional amine precursor reacts with anhydride or hydrolized anhydride groups under the influence of heat to form the imide groups and consequently crosslinks the polymer.

Solvents which can be used in the process of the present invention include phenol and mixtures of o-, p- and m cresols known as cresylic acid and mixtures of cresylic with phenol. In addition phenolic solvent also includes ethylphenols, isopropylphenols, ter-butylphenols, xylenols, mesitols, chlorophenols, dichlorophenols, phenylphenols, etc. The organic solvent component may also be a water-soluble dipolar aprotic solvent, a monoalkyl ether of ethylene glycol having from 1 to about 4 carbon atoms in the alkyl group, a monoalkyl ether of diethylene glycol having from 1 to about 4 carbon atoms in the alkyl groups, a monoaryl ether of ethylene glycol or a monoaryl ether of propylene glycol or mixtures thereof. Suitable dipolar aprotic solvents include, for example, N-methyl-2-pyrrolidone, N,N-dimethylformamide, N,N-dimethylacetamide, dimethylsulfoxide, tetramethylurea, mixtures thereof, and the like. Suitable monoalkyl or monoaryl ethers of ethylene glycol include, for example, the methyl, ethyl, propyl, or butyl ether of ethylene-glycol monoacetate, phenoxy ethanol, mixtures thereof, and the like. Suitable monoalkyl ethers of diethylene glycol include methyl ether, ethyl ether, propyl ether, butyl ether, mixtures thereof, and the like. Suitable monoalkyl or monoaryl ethers of propylene glycol include, for example, propylene glycol phenyl ether, propylene glycol methyl ether, etc. Also included are glycol ether-esters, glycol ether-acetates, glycol ether-butyrates, glycol ether-propionates, and the like. Solvents preferred herein are methyl ether, mixtures of methyl ether and butyl ether, and N-methyl pyrrolidone.

In general, for the oligomer forming reaction solution, the organic diamine component may be included in an amount from about 0.05 mole to about 0.9 mole, preferably from about 0.2 to about 0.8 mole, per mole of dianhydride component. Where more than one compound is included in a component of the present solution, the parts, moles, or other quantity of such component is taken as the sum of the parts, moles, or such other quantity, respectively, of each compound included in such component. Thus, for example, a solution including as the only monomeric reactants, 2.5 moles of 4,4' methylene dianiline, 4.5 moles of 4,4'-bis[4-(3,4-dicarboxyphenoxy)phenyl]propane and 0.5 mole of 4,4'-bis[4-(2,3-dicarboxyphenoxy)phenyl]propane has a ratio of 0.5 mole of organic diamine component per one mole of the dianhydride component.

Experience has shown that sufficient solvent should be utilized to provide a solids content to provide a solution with a workable viscosity for stirring and handling.

Oligomer formation can be effected at temperatures of from about 80° C. to 250° C., and preferably from about 100° C. to 200° C.

It is preferred to effect the reaction of the dianhydride and organic diamine in an inert atmosphere such as nitrogen.

In order to provide optimum contact between the aromatic bis(ether anhydride) and the organic diamine, in the oligomerization reaction solution, the reaction solution can be agitated such as by stirring, etc.

The molar proportions of the monomers used to form the oligomer will vary depending on the molecular weight desired for the oligomer. A high molecular weight oligomer will give a smoother coat, e.g. on wire, but will require more dilution with solvent and consequently more time and energy will be needed in the wire tower for drying and curing. A lower molecular weight oligomer will allow a higher solids content in the coating solution thereby requiring less solvent to obtain a workable coating viscosity and thereby facilitating faster curing and less energy consumption.

Oligomerization reaction time for the bis(ether anhydride) of formula I and the organic diamine of formula II can vary from 0.1 to 20 hours depending upon such factors as the temperature employed, degree of stirring, nature of the reactants, etc.

During the course of oligomer formation and imidization, water may be distilled. The course of reaction may be readily determined, in some cases, by the actual amount of water generated, as a percentage of the theoretical. In particular instances, a mixed solvent system can be employed consisting of a phenolic solvent and a low boiling solvent which forms an azeotropic mixture with water. The low boiling solvents such as cyclohexane, benzene, toluene, chlorobenzene, etc. can be used.

At the termination of the oligomerization and hydrolysis reactions, the triamine, more diamine and optionally more solvent are added to form the final coating solution.

In preparing the final coating solution, the organic amine component may be included in an amount of from 0.5 mole to about 2.0 moles, preferably from about 1 to about 1.3 moles, per mole of aromatic bis(ether anhydride) component. The triamine component may be present in an amount of from about 1.0 to about 60 equivalent percent of the total amine content. Where more than one compound is included in a component of the present solution, the parts, equivalents, or other quantity of such component is taken as the sum of the parts, equivalents or such other quantity, respectively, of each compound included in such component. Thus, for example, total amine content is calculated by adding the equivalent amounts of both diamine and triamine components e.g. 2×(number of moles of diamine)+3×(number of moles of triamine)=total equivalents of amine.

Total anhydride content is calculated in a similar fashion. A slight excess of amine is usually desirable for film flexibility or possible cross-linking.

Terminal amino and phthalic acid or phthalic anhydride end groups can be present.

Experience has shown that sufficient solvent should be utilized to provide a solids content to provide a solution with a workable viscosity for stirring and handling.

Final coating solutions having high ratios of reactants to organic solvent component advantageously minimize the amount of organic solvent released during subsequent formation and cure of polyetherimide resins as in coating operations. Such solutions having high amounts of reactants may have higher viscosities than desired for some coating applications. Typically, inclusion of water decreases the solution viscosity. A given decrease in viscosity may be effected using a lower amount of added water relative to the amount of added organic solvent component which would be required to effect the same viscosity decrease.

Water may be present in any amount up to the maximum amount of which the solution is substantially free of precipitate. Although water is miscible with most of the organic solvent components inclusion of too much water in the coating solution results in precipitate or other plural phase formation. The amount of water which may be present depends on the particular components present, the particular organic solvent component, and the weight ratio of reactants to organic solvent.

Advantageously, the present final coating solutions may include reactants in a combined amount of 25 or more percent, e.g. from about 25 to 75 or more percent by weight based on the weight of the solution. In general, solutions of such concentrations, including water as may be required, have suitable viscosities in the temperature range, e.g. between 150 CPS and 5000 CPS at about 20° to about 40°, normally used in metal conductor (e.g. wire) enameling operations for employment therein. Heretofore known polyetherimide wire enameling solutions typically contain 15 to 25 percent by weight polyether-amide-acid polymer in organic solvents, wherein the polymer concentration is limited to the indicated low amounts due at least in part to the often unacceptably high viscosity of more highly concentrated polymer solutions. Coating solutions of etherimide monomers with solids contents of up to 75% have been disclosed but exhibited poor film forming properties. Advantages of the present highly concentrated oligomer solutions include a low amount of total solvent to be removed in preparing coatings, low energy consumption for solvent removal, and a combination of the good film forming characteristics of oligomer solutions and the high temperature characteristics resulting from the performed crosslink formed by the triamines. The coatings of the present invention can also be consistently cured to a reproducable degree at lower temperatures since conventional oxidative crosslinking is not necessary and the amount of triamine is easily controllable.

The final coating solution may be prepared by mixing, as by stirring, until the components are dissolved. In general, the various components; (oligomer solution, triamine, added diamine, solvent,) may be added in any sequence. If desired, the monomeric and oligomeric components may be dissolved in the organic solvent component, followed by adding water or solvent with stirring until a desired decrease in viscosity is effected. However, solutions including water are more easily prepared by adding the reactant components with stirring to a solution of the water and organic solvent component. Preparation of the solution is generally accelerated at elevated temperatures.

The polyetherimide reaction products can be reinforced with conventional fillers, for example, perlite, fume silica, etc., carbon whiskers, glass fibers, etc. at proportions of from 10 to 60 parts of filler, per 100 parts by weight of polyetherimide.

The liquid coating solutions of the present invention have many and varied uses. The coating solutions may be applied to a variety of substrates using any suitable coating method, e.g. dipping, brushing, spraying, wiping and the like, and thereafter heated to evaporate the solvent system and form cured polyetherimide resinous coatings. The temperature is preferably increased gradually to produce smooth resinous coatings. The polymerization and cure proceeds advantageously at a temperature of from 125° C. to about 300° C. or more.

The present coating solutions may be employed as wire enamels to form resinous insulating coatings on copper and aluminum wire, as varnishes for coating or impregnating various substrates such as coils of previously insulated wire (e.g. in motor and generator coils), woven and non-woven fabrics, etc. Additives, e.g. light stabilizers, oxidation inhibitors, surfactants, etc., may be included in the present coating solutions.

For utilization as wire enamels, the present coating solutions desirably have a viscosity from about 150 to about 5,000, preferably from about 500 to about 2500, centistokes at 25° C.

The coating solutions may be applied immediately upon preparation or stored prior to use. In general, maximum storage life can be obtained by storing the solutions under a nitrogen blanket in the absence of light.

In order that those skilled in the art will be able to practice the invention, the following examples are given by way of illustration and not by way of limitation. All parts and percents are by weight unless otherwise indicated.

EXAMPLES

Polyetherimide oligomer solutions were prepared by reacting 1653 grams (6.358 equivalent) of 2,2-bis[4-(3,4-dicarboxyphenoxy)phenyl]propane dianhydride with 378 grams (3.81 equivalents) of 4,4'-methylene dianiline in the presence of 2438 grams of a glycol ether solvent system and 90 grams of water. The glycol ether solvent solution contained 51% monomethyl ether of diethylene glycol, 8% monoethyl ether of diethylene glycol, 11% monobutyl ether of diethylene glycol, and 30% 2-hydroxy propyl ether. The oligomerization reaction and hydrolysis was carried out in a 5 liter glass reaction vessel equipped with a Dean-Stark trap, electric stirrer, thermometer, and a reflux condenser. An inert atmosphere was maintained throughout the reaction. This monomer solution was heated to 133° C. for 2 hours with constant stirring while approximately 45 grams of water was distilled and the oligomers formed and imidized. The oligomer solution obtained was then cooled to ambient and 180 grams of 4,4'-methylene dianiline was added to bring the diamine content to 90% of the theoretical equivalency. During the heating, the solution becomes very viscous due to the amide-acid formation. Continued heating imidizes the amide acid groups with release of water and a consequent decrease in solution viscosity. This released water along with the initially added water hydrolyzes most remaining anhydride groups. The oligomer solution was then diluted with 614 additional grams of the glycol ether solvent solution to lower the viscosity and yield the oligomer solution. The final coating solutions were prepared from this oligomer solution.

These final coating solutions including triamine were then coated on wire by standard techniques.

Cut-through temperatures in the examples were determined by a test wherein a cured film is placed between two bare copper wires crossed at a 90° angle in a cut-through apparatus commonly employed by the electrical industry in the evaluation of enameled magnet wire J.A.N.-W-583 (Apr. 7, 1948). The copper wires are electrically insulated from a metal base plate by 5-mil mica sheet. The test apparatus is then placed in an air circulating oven with the copper wires connected to a 110-volt AC circuit containing an alarm system. A 1000 gram-load is placed on the crossed wire pair. The loaded film resting between the crossed wires is heated in an air-circulating oven at a rate of about 10° C. per minute. The cut-through temperature is the temperature at which the crossed wires short circuit, i.e., electrical contact is made between the wires through the film, as indicated by activation of the alarm.

The coatings were cured for 10' at 150° C., 10' at 200° C., 5' at 250° C. and 10' at 300° C. The coating compositions and cut-through temperatures are shown in the following examples.

|  | Cut-Through °C. |
|---|---|
| EXAMPLE 1 |  |
| 1201 grams of oligomer solution | 350 |
| 17 grams of 4,4'-methylene dianiline |  |
| 9 grams of BABA (5 equivalent percent triamine |  |
| 7 equivalent percent amine) |  |
| EXAMPLE 2 |  |
| 1208 grams of oligomer solution | 375 |
| 4.2 grams of 4,4'-methylene dianiline |  |
| 15 grams of BABA (10 equivalent percent triamine |  |
| 3 equivalent percent amine) |  |
| EXAMPLE 3 |  |
| 1000 grams of oligomer solution | 400 |
| 18 grams of BABA (15 equivalent percent triamine |  |
| 5 equivalent percent amine) |  |

These high temperature enamels also exhibited a smoothness acceptable for use in high speed wire winding machines.

Other modifications and variations of the present invention are possible in light of the above teachings. It is, therefore, to be understood that changes may be made in the particular embodiments described above which are within the full intended scope of the present invention as defined in the appended claims.

What is claimed is:

1. A process for preparing a coating solution including oligomeric polyetherimides comprising:
   (a) reacting at least one aromatic bis(ether anhydride) of the formula:

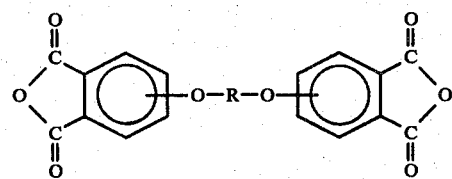

with less than a stoichometric amount of at least one diamine of the general formula:

in a suitable solvent to form oligomeric polyetheramic acids containing termanal anhydride groups (b) heating the solution of (a) to form oligomeric polyetherimide anhydrides (c) hydrolizing the oligomeric anhydrides of (b) to form the free acids of the formula:

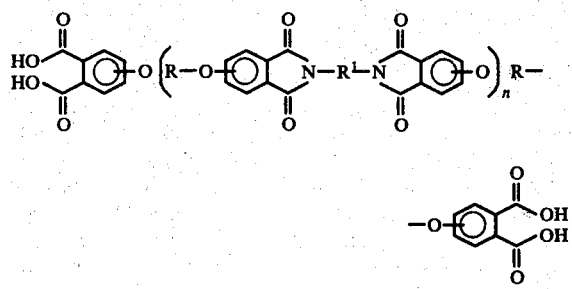

(d) adding to the oligomer solution of (c) triamines of the general formula:

and more of the same or different diamine, where R is a member selected from the class consisting of (A) divalent organic radicals having the following formulas:

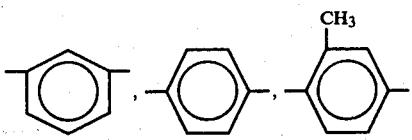

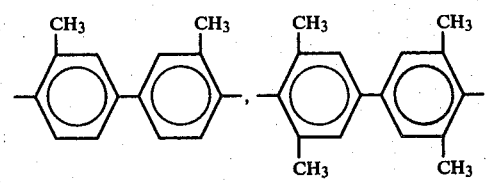

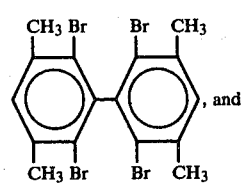

-continued

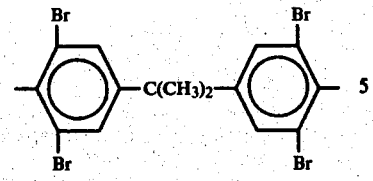

and (B) divalent organic radicals of the general formula:

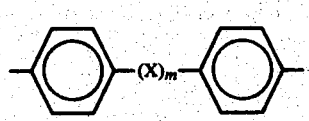

where m is 0 or 1 and X is a member selected from the class consisting of divalent radicals of the formulas,

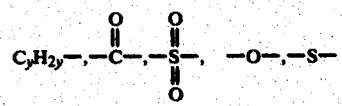

where y is an integer from 1 to 4; $R^1$ is a divalent organic radical selected from the class consisting of (a) aromatic hydrocarbon radicals having from 6 to about 20 carbon atoms and haloginated derivatives thereof, (b) alkylene radicals having from 2 to about 20 carbon atoms, and cycloalkylene radicals having from 3 to about 30 carbon atoms, (c) from $C_2$ to about $C_8$ alkylene terminated polydiorganosiloxane, and (d) divalent radicals of the general formula:

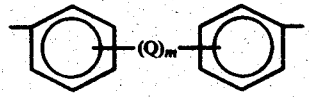

where m is as previously defined and Q is a member selected from the class consisting of

where x is an integer from 1 to 5 inclusive, $R^2$ is a member selected from the class consisting of (a) the following trivalent aromatic radicals

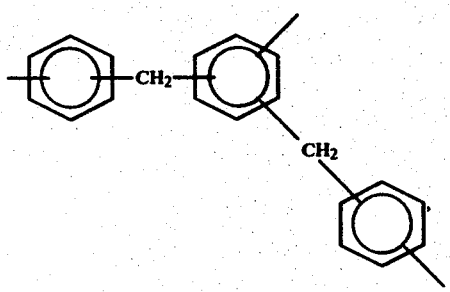

-continued

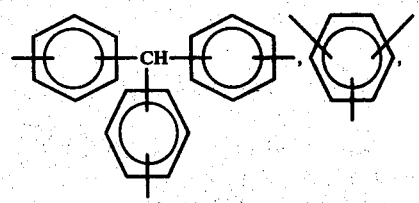

and (b) trivalent aliphatic radicals;

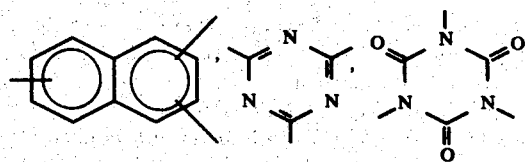

and n is an integer from 0 to 100.

2. The process of claim 1 wherein the diamine is used in a ratio of between 0.5 and 2.0 moles diamine per mole of dianhydride.

3. The process of claim 1 wherein the diamine is used in a ratio of between 1.0 and 1.2 moles diamine per mole of dianhydride.

4. A process of claim 1 where the aromatic bis(ether anhydride) is

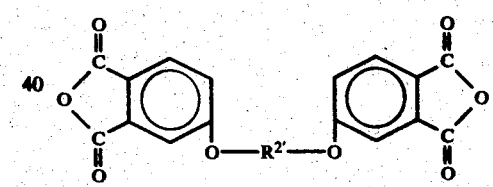

where $R^{2'}$ is 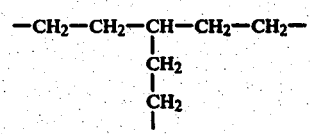

and $Q^1$ is selected from 

5. A process of claim 1 where the aromatic bis(ether anhydride) is

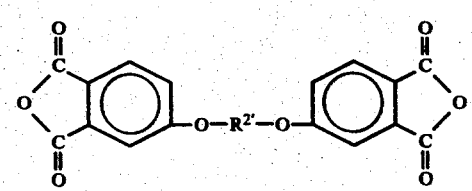

where $R^{2'}$ is as previously defined.

6. A process of claim 1 where the organic diamine is methylene dianiline.

7. A process of claim 1 where the organic diamine is oxydianiline.

8. The process of claim 1, where the aromatic bis (ether anhydride) is 2,2-bis[4-3(3,4-dicarboxyphenoxy)phenyl]propane dianhydride and the organic diamine is 4,4'-methylenedianiline.

9. The process of claim 1 where the triamine is 2,4-bis(p aminobenzyl)aniline.

10. The process of claim 1 where the triamine is melamine.

11. The process of claim 1 where the triamine is obtained by the hydrolysis of a phenol blocked polymeric 2,4-toluene diisocyanate.

12. The process of claim 1 wherein the triamine is used in a ratio of between 1 percent to about 60 equivalent percent bis(ether anhydride).

13. A coating solution prepared by the process of claim 1.

14. A coating solution prepared by the process of claim 9.

15. A coating solution prepared by the process of claim 10.

16. A coating solution prepared by the process of claim 11.

17. An insulated electrical conductor coated with the coating solution of claim 13.

18. An insulated electrical conductor coated with the coating solution of claim 14.

19. An insulated electrical conductor coated with the coating solution of claim 15.

20. An insulated electrical conductor coated with the coating solution of claim 16.

* * * * *